Inventors:
Robert A. Thompson,
Stephen E. Grabkowski,
Bjorn Weichbrodt,

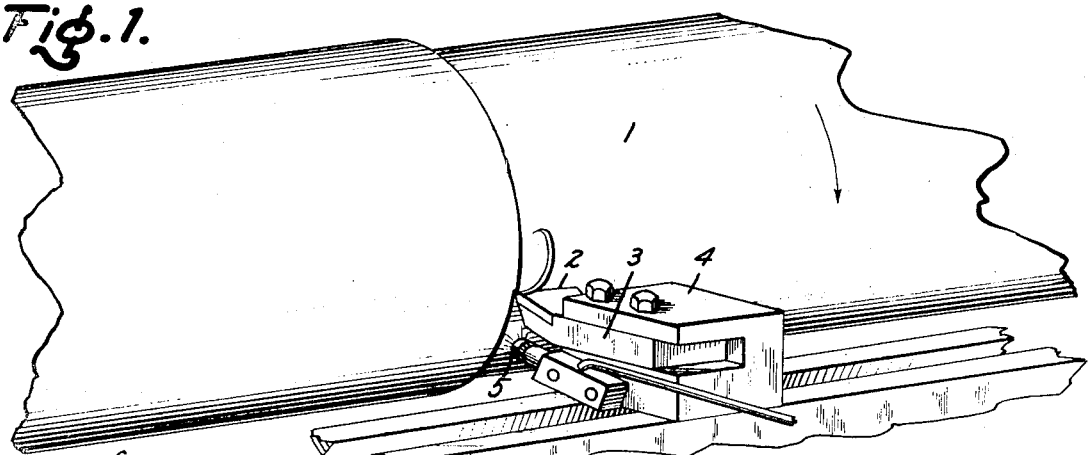
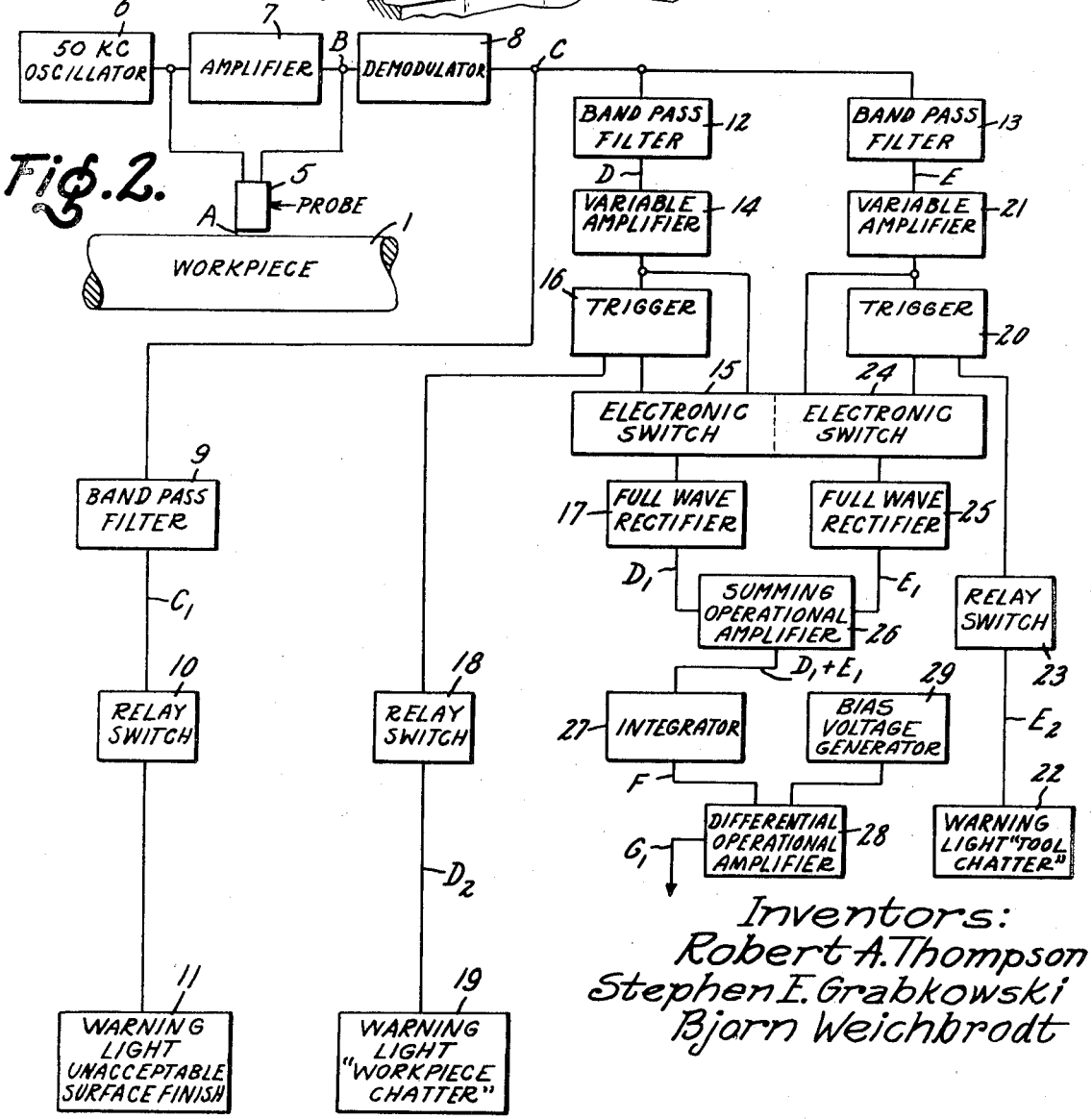

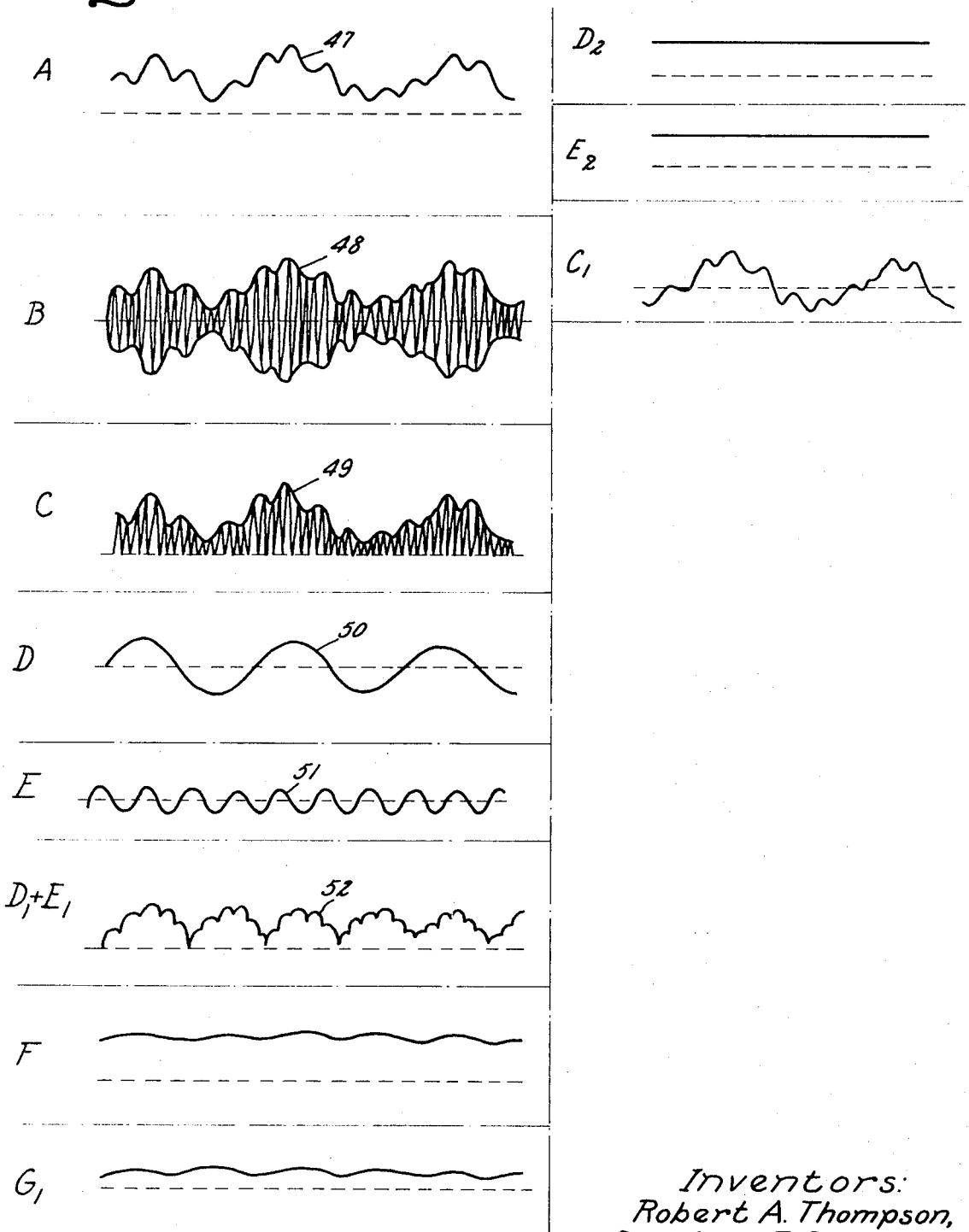

United States Patent Office 3,550,107
Patented Dec. 22, 1970

3,550,107
MACHINING STABILITY DETECTOR
Robert A. Thompson, Windham, and Stephen E. Grabkowski and Bjorn Weichbrodt, Schenectady, N.Y., assignors to General Electric Company, a corporation of New York
Filed Dec. 4, 1967, Ser. No. 687,804
Int. Cl. G08b 23/00
U.S. Cl. 340—267     7 Claims

ABSTRACT OF THE DISCLOSURE

A proximity detector, such as, a capacitive probe, is located on a toolholder and its capacitance varies with the distance between the probe and the workpiece to be machined. A high frequency oscillator provides a carrier wave which is modulated according to variations in the distance between the probe and the workpiece. The demodulated output signal voltage indicates the distance separating the probe and workpiece. The output from the demodulator is conducted into three separate channels: (1) a band pass filter which removes the D.C. component and carrier voltage to provide a remaining fluctuating signal which is indicative of the distance variations between probe and workpiece, a high voltage indicating an unacceptable surface finish; (2) a "workpiece chatter predictor" circuit, the first element of which is a band pass filter having as its lower limit, about one half of the first resonant frequency of the workpiece and having as its upper limit a frequency about one and one half times the first resonant frequency of the workpiece, the output from the band pass filter being conducted through a variable amplifier into a trigger circuit which may initiate a warning indication of incipient workpiece chatter; (3) a "tool chatter predictor" circuit, the first element of which is a band pass filter set with its lower limit at about one half the first resonant frequency of the tool with toolholder and its higher limit at about three times the lower limit, the energy passing through this band pass filter actuating a warning light indicating incipient tool chatter. The energy passing through the second and third filters may be summed to give an input to a differential operational amplifier which is conducted into a device operative to control the rate of feed of the tool to the workpiece, the signal thus generated causing a control device to automatically adjust feed speed to keep the machining operation just on the verge of chatter.

---

Our invention relates to a method and apparatus for the detection of incipient tool or workpiece chatter and most particularly for the detection and control of the undesirable condition known as tool or workpiece chatter by regulating the feed of the tool.

The detection means is a proximity detector which may be a capacitor the value of which depends on the distance between the probe and workpiece. Likewise, the proximity detector may be inductive or optical or any other type of distance sensor.

An object of this invention is to maintain a maximum metal removal rate just short of chatter.

Another object of this invention is to continuously monitor the cutting stabiilty and give an indication of incipient workpiece chatter or alternatively of tool chatter.

It is another object of this invention to indicate by a worning light when an unacceptable surface finish is ensuing.

It is a final object of this invention to generate a signal which can be used for control of the feed of the tool to keep it just below chatter, i.e., to give maximum metal removal rate with a smooth surface finish.

In brief, our invention is a proximity detector which may be an inductive or a capacitive probe located on a toolholder to give an output depending on the distance separating the probe and the workpiece. For example, in the case of a capacitive probe, the output of a high frequency oscillator is fed through the probe capacitance to give a high frequency carrier modulated according to the variance in the probe capacitance as it is affected by the vibrations of the toolholder relative to the workpiece. This signal is rectified and the rectified signal is conducted into three separate filters for further analysis, resulting in an indication of either an unacceptable surface, a warning of incipient workpiece chatter, a warning of incipent tool chatter, or a signal suitable to be used to control feed speed or some other machining parameter.

Additional objects and features of the invention pertain to the particular structural arrangements and control circuits whereby the above objects are attained. In order that the principle of the invention may be readily understood, a single embodiment thereof is described and applied to a numerically controlled lathe. It is understood that the application is not restricted to this lathe or to the sole embodiment shown in the accompanying drawings but may be used in a milling machine or planer, for example.

FIG. 1 shows a perspective view of the toolholder, capacitive probe, and workpiece.

FIG. 2 shows a block diagram of the incipient chatter detector and control unit.

FIG. 4 shows the signal output at various stages of the detector where there is incipient chatter of both the tool and workpiece, simultaneously.

Figure 3:
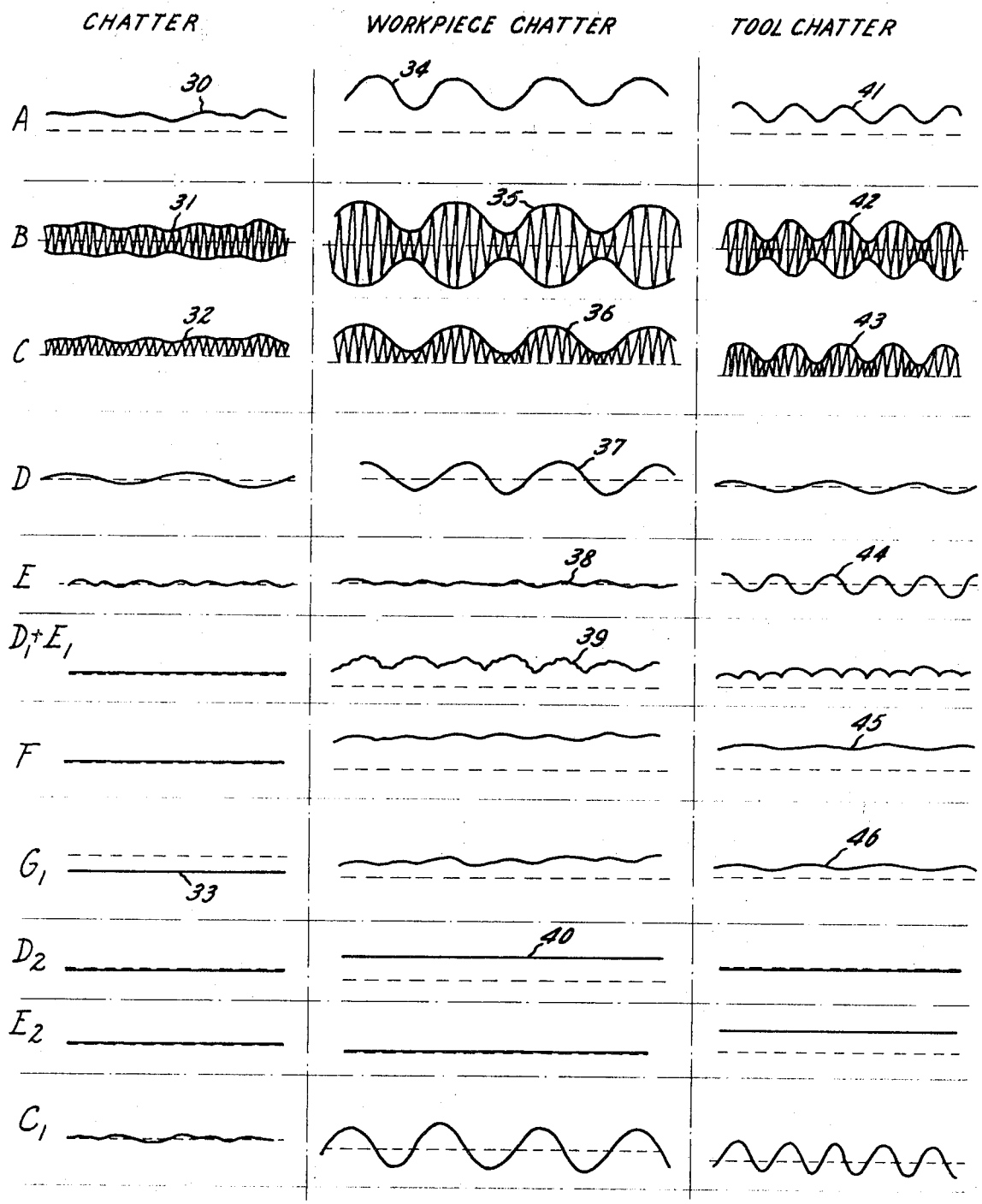
FIG. 3 shows the signal output at different stages of the detector of FIG. 2 for machining conditions comprising either no chatter, incipient workpiece chatter, or incipient tool chatter.

The essential steps in the operation of this embodiment are:

First, rigidly connect a capacitive probe to the toolholder.

Second, move the probe adjacent to the workpiece so as to form a capacitance whose value varies with the separation of probe and workpiece.

Third, connect a high frequency carrier signal with the probe in such a way that the carrier is modulated by variations in the probe capacitance.

Fourth, rectify and thereby demodulate the modulated signal to obtain a voltage which is a measure of the distance separating the probe and the workpiece.

Fifth, conduct the rectified signal through a band pass filter to remove the D.C. component and high frequency carrier from the signal, and then to a relay switch and to a warning light indicative of unacceptable surface finish.

Sixth, conduct the rectified signal through a band pass filter, the lower limit of which is one half of the first resonant frequency of the workpiece and the higher limit is three times the lower limit. This signal may trigger a warning light to indicate incipient workpiece chatter.

Seventh, conduct the rectified signal into a second band pass filter, the lower limit of which is one-half of the first resonant frequency of the tool with toolholder and the higher limit is three times the lower limit. The energy coming through this band pass filter is conducted through a relay switch to a warning light to give an indication of incipient tool chatter. The energy through band pass filter mentioned in the previous paragraph and band pass filter mentioned above in this paragraph may be united to give a signal suitable for control of tool feed rate.

Referring now to the figures:

FIG. 1 shows a large workpiece 1 turning in the indicated direction and being machined by some sort of lathe. A cutting edge 2 is mounted on a toolholder 3 which is fastened in a tool post 4. A capacitive probe 5 is mounted just below the cutting edge. The capacitive probe 5 is located adjacent workpiece 1 in such a way as to form a capacitance which depends on the separation of the probe and workpiece. If the probe 5 or workpiece 1 vibrate out of phase with each other the separation and therefore the capacitance of the probe is varied depending upon the tool-workpiece oscillation lag. The stability of the cutting process varies with this lag.

In FIG. 2, a high frequency voltage signal is generated by an oscillator 6. Immediately before leaving the oscillator the signal passes through a capacitor (not shown) having a capacitance approximately that of the probe. This capacitor is part of the oscillator in the figure. The output from oscillator 6 is conducted to a high gain amplifier 7 and the output of the amplifier is conducted back through the probe capacitance to the input of the amplifier. Through this feedback system the output voltage of the amplifier consists of the high frequency carrier with an instantaneous amplitude determined by the instantaneous distance between the workpiece and the probe. Therefore, the modulation amplitude of this carrier depends on the trough-to-peak vibration of the probe relative to the workpiece. The output from amplifier 7 and probe 5 is conducted to a full wave rectifier which acts as a demodulator 8. The output of the full wave rectifier is an electrical voltage which is a measure of the distance separating the probe and the workpiece. This output is fed into three separate circuits. The first circuit has in series a band pass filter 9, a relay switch 10, and a warning light 11 indicative of unacceptable surface finish. The band pass filter 9 passes all voltages except the D.C. component voltage and the carrier voltage. The output from the band pass filter 9 is indicative of the relative motion between tool 2 and workpiece 1, and therefore, of surface finish, i.e., a high voltage representing a poor surface finish while lower voltages correspond to better surface finishes. This output can be measured by a warning light 11 or a root-mean-square voltmeter. The root-mean-square voltmeter may be calibrated to indicate a point of unacceptability of surface finish. Alternatively, as shown in FIG. 2, a relay switch 10 may be inserted to operate the warning light at some level of signal strength.

The signal from the demodulator is supplied also to two band pass filters connected in parallel. The first band pass filter 12 has as its lower limit about one-half the first resonant frequency of the workpiece and its high pass limit is three times the lower limit. The first resonant frequency of an element is defined as the lowest frequency at which the element under consideration has mechanical resonance. The second band pass filter 13 has its lower frequency at about one-half the first resonant frequency of the tool and its higher limit at three times the lower limit.

The first band pass filter 12 passes all of the signals related to incipient workpiece vibration. This signal is conducted to a variable amplifier 14 and the variable amplifier output is passed directly to an electronic switch 15 which is normally open. Another portion of its output is passed to a trigger 16 made up of a comparator and a one shot actuator. When a predetermined level is reached at the output of the variable amplifier, the trigger activates the electronic switch 15, which then passes the signal from the variable amplifier to the full wave rectifier 17. The trigger 16 also energizes a relay 18 which lights a warning light 19 indicative of incipient workpiece chatter.

At the same time a similar thing is happening to those signals whose frequencies lie between a lower frequency of one-half the resonant frequency of the tool and a frequency which is three times the lower frequency. Voltages of these frequencies are supplied to the third circuit exactly the same way as discussed above to a second electronic trigger switch 20. If the output voltage from the variable amplifier 21 is sufficiently high, the warning light 22 for tool chatter is actuated through relay switch 23.

The output from the first electronic switch 15 and the second electronic switch 24 are fed respectively into two full wave rectifiers 17 and 25 and from there are combined by a summing operational amplifier. The output of the summing operational amplifier is conducted to an integrator 27 and then into a differential operational amplifier 28. In the differential operational amplifier the voltage is biased against a variable bias from a voltage generator 29 and the signal obtained is indicative of machining stability and will indicate both incipient workpiece and tool chatter.

For maximum cutting efficiency, the feed rate must be kept at its maximum value just below the point at which chatter marks would appear on the surface of the workpiece. In order to accomplish this effect a negative bias from the generator 29 is used to offset the signals caused by noise in the cutting machine and the machining vibration which are insufficient to produce unstable machining and visible chatter. This bias can be adjusted according to the speed of correction desired. Thus, when the feed rate falls to a level that does not cause any vibration or causes vibrations below the incipient chatter level then the negative bias signal will be conducted to the adaptive control circuit and cause speed up of the feed rate to approach the optimum level. The signal from the differential operational amplifier can be used as a correction signal in a machine adaptive control system.

It is noted above that in these circuits the variable amplifiers can be set to whatever levels are desired in order to give due weight to the signal coming from the workpiece relative to the signal coming from the tool. In this way the signals coming from the workpiece and tool can be balanced to give a final total prechatter signal which will be suitable for control of machining parameters of an adaptive control system.

If the triggers and electronic switches are eliminated the system will operate but less efficiently. The principal functions of these elements is to provide actuation of the numerical control only when predetermined levels of signal are fed into the circuit thereby avoiding frequency adjusting of the adaptive control with minor variations of the signal and providing a fast rate of increase of the feed speed up to the rate just below chatter.

Likewise, if the integrator is eliminated the response will be less even and there may be quick changes in the direction of the numerical control if the peaks of the voltage from the summing operational amplifier exceed the negative bias voltage from the bias voltage generator.

The electrical signals at various stages are shown in FIG. 3. The left hand column shows the electrical signal at various stages of the apparatus when no chatter is present. The middle column shows the signal present at various stages of the apparatus when chatter from the workpiece is present. On the right is shown the signal present at various stages of the apparatus when tool chatter is present in the circuit. The headings A thru G on the extreme left indicate particular points in the circuit identified by corresponding letters in FIG. 2. The wave shapes which are discussed are given reference numbers.

Considering first the case of no chatter or incipient chatter, at the point A, the workpiece and probe remain a more or less constant distance 30 apart therefore no signal is generated from this source. The interaction of the oscillator and amplifier with the probe does not generate any modulating signal at the point B so that whatever frequency is generated by the oscillator is substantially unmodulated, and the envelope 31 is flat. When the unmodulated carrier has been demodulated, the output of C has a D.C. level 32 indicative of the pre-set distance between the probe and workpiece, or in others words there is no significant A.C. output. After the demodulated output is passed through filters 12 and 13, there is no signal found until the point $G_1$ is reached. At this point the bias voltage generator because of its negative aspect gives a negative bias 33 to the signal coming from the differential operational amplifier 28. In this case a negative signal is conducted to the adaptive control circuit. At all other points such as $D_2$, $E_2$ there is no signal since the appropriate triggers are not actuated by the low level of input signal.

Considering the second situation shown in FIG. 3 where there is some workpiece chatter, then the motion between the probe and the workpiece is reflected as a signal at the point A. This signal is best represented by a simple sine curve 34 or some other similar curve such as that shown under workpiece chatter at point A. This signal is impressed upon the carrier to modulate it and give an envelope 35 such as shown under workpiece chatter at B. After this signal envelope passes through the full wave rectifier, demodulator 8, the signal curve 36 has the appearance indicated at C under workpiece chatter. The signal is then conducted through band pass filter 12 which allows only those frequencies close to the first resonant frequency of the workpiece to pass and therefore filters out the carrier wave leaving only the modulation frequency 37 as shown at D under workpiece chatter. At the same time the signal is conducted to band pass filter 13 which passes only frequencies near the first resonant frequency of the tool and does not pass either the first resonant frequency of the workpiece or the carrier wave. Its output as shown by curve 38 is close to zero. The signal 37 passed through band pass filter 12 is conducted to the variable amplifier 14 and is amplified therein. The amplifier output is conducted to an one shot trigger 16 and also conducted around trigger 16 to the electronic switch 15. If the signal from the amplifier is higher than a preset level, the trigger 16 actuates the electronic switch 15 so that the signal at the output of the amplifier 14 passes through the electronic switch 15 to full wave rectifier 17 thus giving finally a signal 39 which is then combined with the tool chatter signal, if any. The resultant signal shown at $D_1$ and $E_1$ is passed into integrator 27 where it is smoothed to result in a slowly varying voltage such as shown under workpiece chatter at F. This voltage is conducted to differential operational amplifier 28, is biased by the bias voltage generator 29 to give a prechatter signal suitable to be conducted to the input of an adaptive machining control system.

At the same time, the signal from the variable amplifier 14 and trigger 16 is supplied to relay switch 18. If the signal is of sufficient magnitude to operate relay switch 18, voltage 40 is impressed on warning device 19 to provide a warning indication of workpiece chatter.

As shown in FIG. 3, when tool chatter is generated at the tool post giving rise to a signal at A, the frequency is higher and the level of amplitude is somewhat lower case depending upon the particular tool or toolholder involved. In the situation shown under tool chatter, the frequency of vibration of the tool is considerably higher than that of the workpiece. If a signal 41 is generated, this frequency signal is imposed upon the carrier wave to result in a wave train 42 similar to that shown at B and the resultant wave is demodulated to provide the fully rectified signal 43 shown at C. This signal is filtered by band pass filter 13 to remove the carrier wave while permitting passage of tool chatter portion 44 through the band pass filter. No portion of this signal will pass through band pass filter 12. However, signal 44 shown at E under tool chatter is conducted from the band pass filter 13 to the variable amplifier 21 where it is magnified and passed to trigger 20 and to electronic switch 24. Trigger 20 generates a signal which at a certain level of input actuates electronic switch 24 and the relay switch 23 in the same manner as explained above. The signal output of full wave rectifier 25 is added to the signal, if any, from full wave rectifier 17 and the combined signal conducted to integrator 27. The integrator smooths this signal to give a resultant signal similar to signal 45 shown at F under tool chatter. This signal passes to the differential operational amplifier 28 where it is matched against the bias voltage and the resultant 46 shown at G under tool chatter is conducted from differential amplifier 28 to provide a prechatter signal suitable for control of an adaptive control system.

In some cases of machining both tool and workpiece chatter may occur simultaneously. This situation is shown in FIG. 4 where a capacitive or inductive probe, for example, receives a signal 47 such as shown at A in FIG. 4. The signal is a composite of two signals, one from the motions of the workpiece and one from the motions of the tool. When these signals are impressed upon the carrier of signal 48 such as that shown at B of FIG. 4 is given. After this signal has been demodulated, a signal 49 is generated (shown at C) of approximately the same voltage as the unrectified signal 48. The portion of the signal caused by workpiece chatter passes through band pass filter 12 to give signal 50 while that portion caused by tool chatter passes through band pass filter 13 to give signal 51. These signals pass through their respective circuits as discussed above until they come through their full wave rectifiers to the point indicated as $D_1$ and $E_1$ where they give a signal 52 caused by signal 47 at A. The signal 52 is smoothed by integrator 27 and passed through differential operational amplifier 28 to give a prechatter signal such as shown at G suitable for use in a machine adaptive control device.

In this situation, the warning light circuits individually flash, assuming suitable level of signal input, and give an output to cause the operation of the lights. The warning light of $C_1$ operates on a different principle as explained above, and gives an indication only if there is an unacceptable surface finish. Clearly, the numerical control circuitry will work with full efficiency without any warning lights.

While the foregoing is a description of an illustrative embodiment of the invention, it is applicant's intention in the appended claims to cover all forms which fall within the scope of the invention.

What we claim as new and desire to secure by Letters Patent of the United States is:

1. In combination,
    a machine tool including a workpiece holder and a cutting toolholder,
    a workpiece mounted on said workpiece holder,
    a cutting tool secured to said cutting toolholder,
    means for moving said toolholder in relation to said workpiece to engage said workpiece by said cutting tool and remove material therefrom,
    means for sensing displacement of said toolholder and said workpiece in relation to one another and for converting said displacement into an electrical signal,
    a filter means for passing the frequency components of said electrical signal laying in a narrow band including the natural resonant frequency of said workpiece as mounted to produce a resultant signal, and
    means responsive to said resultant signal above a predetermined level for providing indication of chatter above a predetermined level in said machine tool.

2. In combination,
    a machine tool including a workpiece holder and a cutting toolholder,
    a workpiece mounted on said workpiece holder,
    a cutting tool secured to said cutting toolholder,
    means for moving said toolholder in relation to said workpiece to engage said workpiece by said cutting tool and remove material therefrom,
    means for sensing displacement of said toolholder and said workpiece in relation to one another and for converting said displacement into an electrical signal,
    a filter means for passing the frequency components of said electrical signal lying in a narrow band including the natural resonant frequency of said toolholder with tool attached to produce a resultant signal, and means responsive to said desultant signal above a predetermined level for providing indication of chatter above a predetermined level in said machine tool.

3. In combination, a machine tool including a workpiece holder and a cutting toolholder, a workpiece mounted on said workpiece holder, a cutting tool secured to said cutting toolholder, means for moving said toolholder in relation to said workpiece to engage said workpiece by said cutting tool and remove material therefrom, means for sensing displacement of said toolholder and said workpiece in relation to one another and for converting said displacement into an electrical signal, a first filter means for passing the frequency components of said electrical signal lying in a narrow band including the natural resonant frequency of said workpiece as mounted to produce a first resultant signal, a second filter means for passing the frequency components of said electrical signal lying in another narrow band including the natural resonant frequency of said toolholder with tool attached to produce a second resultant signal, and means responsive to one of said resultant signals above a predetermined level for providing indication of chatter above a predetermined level in said machine tool.

4. The combination of claim 3 in which rectifier means is provided responsive to one of said resultant signals above a predetermined level for providing a unidirectional signal representing chatter in said machine tool above a predetermined level.

5. The combination of claim 3 in which rectifier means is provided responsive to both of said resultant signals above predetermined levels for providing a resultant unidirectional signal representing chatter in said machine tool above a predetermined level.

6. The combination of claim 3 in which said means for sensing said displacement and for converting said displacement into an electrical signal includes a proximity detector mounted on said toolholder and a signal generating circuit electrically connected to said proximity detector for generating a signal the frequency of which is a time function of said displacement and the amplitude of which is a function of the amplitude of said displacement.

7. The combination of claim 3 in which said first filter means has a lower limit of about one half the natural resonant frequency of said workpiece and an upper limit of about one and one-half times the natural resonant frequency of said workpiece, and in which said second filter means has a lower limit of about one half the natural resonant frequency of said toolholder and an upper limit of about one and one-half times the natural resonant frequency of said toolholder.

References Cited

UNITED STATES PATENTS

| | | | |
|---|---|---|---|
| 2,802,178 | 8/1957 | Shafer et al. | 324—61 |
| 3,089,332 | 5/1963 | Comstock | 73—71.4 |
| 3,201,776 | 8/1965 | Morrow et al. | 340—261 |
| 3,348,234 | 10/1967 | Foster | 73—71.4UX |
| 3,353,098 | 11/1967 | Foster et al. | 73—71.4UX |

THOMAS B. HABECKER, Primary Examiner

D. L. TRAFTON, Assistant Examiner

U.S. Cl. X.R.

340—261; 324—61; 73—71.4